US012139965B2

(12) United States Patent
Capraun

(10) Patent No.: US 12,139,965 B2
(45) Date of Patent: Nov. 12, 2024

(54) PET DOOR INSERT FOR SLIDING DOORS

(71) Applicant: Maria Capraun, Georgetown, CA (US)

(72) Inventor: Maria Capraun, Georgetown, CA (US)

( * ) Notice: Subject to any disclaimer, the term of this patent is extended or adjusted under 35 U.S.C. 154(b) by 35 days.

(21) Appl. No.: 16/865,375

(22) Filed: May 3, 2020

(65) Prior Publication Data

US 2024/0240512 A1 Jul. 18, 2024

(51) Int. Cl.
*E06B 7/32* (2006.01)

(52) U.S. Cl.
CPC .................................... *E06B 7/32* (2013.01)

(58) Field of Classification Search
CPC .................................... E06B 7/32; E06B 9/52
See application file for complete search history.

(56) References Cited

U.S. PATENT DOCUMENTS 1,186,565 A * 6/1916 Fogg .................... E06B 7/32 49/169
2,756,466 A * 7/1956 Garland .................... E06B 7/32 49/368
3,138,829 A * 6/1964 Grose .................... E06B 7/28 49/193
3,811,224 A * 5/1974 Garrison .................... E06B 7/32 160/180
4,173,099 A * 11/1979 Robb .................... E06B 7/32 49/168
4,322,913 A * 4/1982 Himmer .................... E06B 7/32 49/168
4,478,267 A 10/1984 Smiley
5,105,868 A 4/1992 Riise
5,185,954 A 2/1993 Waddle, Sr.
5,551,188 A * 9/1996 Davlantes .................... E05B 13/005 292/132
5,581,940 A * 12/1996 Peterson .................... E06B 7/32 49/386
5,946,855 A 9/1999 Miconi
6,164,013 A 12/2000 Ramsey
6,272,793 B1 * 8/2001 Davlantes .................... E06B 7/32 49/501
6,691,483 B2 2/2004 Lethers
7,024,820 B1 4/2006 Dustin
7,159,361 B1 1/2007 Hale, Jr.
7,207,141 B2 4/2007 Sullivan
8,074,606 B1 12/2011 Schrey et al.
8,333,037 B2 12/2012 Sullivan
8,567,137 B2 10/2013 Sullivan
9,388,631 B2 7/2016 Woeltjen, Jr.
10,435,942 B1 10/2019 Dunavin
11,702,885 B1 * 7/2023 Harrington .................... A01K 29/00 49/31
2005/0126092 A1 * 6/2005 Guy .................... E06B 7/32 52/204.51
2005/0263091 A1 * 12/2005 Knapp .................... A01K 1/033 119/484

(Continued)

*Primary Examiner* — Justin B Rephann

(57) ABSTRACT

An insert for a sliding door including an insert door frame configured to be inserted into and coupled to a track of a sliding door. The insert for a sliding door also includes at least one hinge coupled to the insert door frame and a swinging door coupled to the hinge. The insert for a sliding door further includes a pet door section of the swinging door configured to have at least one pet door coupled to the pet door section allowing ingress and egress for a pet through the at least one pet door by a pet.

10 Claims, 6 Drawing Sheets

(56) References Cited

U.S. PATENT DOCUMENTS

| | | | | |
|---|---|---|---|---|
| 2006/0053693 | A1* | 3/2006 | Sullivan | E06B 7/32 49/168 |
| 2006/0201638 | A1* | 9/2006 | Hesketh | E06B 7/32 160/180 |
| 2007/0000449 | A1* | 1/2007 | Martin | E06B 7/32 119/484 |
| 2020/0362621 | A1* | 11/2020 | Angelone | E06B 3/5072 |
| 2021/0324672 | A1* | 10/2021 | Altiner | G07C 9/28 |

* cited by examiner

PET DOOR INSERT FOR SLIDING DOORS

REFERENCE TO RELATED APPLICATIONS

This Application is a nonprovisional patent application claiming priority to U.S. Provisional Patent Application No. 62/847,319 entitled RECAP SWINGIN HUMAN PET DOOR to Maria Capraun, filed on May 14, 2019, which is herein incorporated by reference in its entirety.

TECHNICAL FIELD

The present disclosure relates to pet doors configured for use with sliding doors.

BACKGROUND

The statements in this section merely provide background information related to the present disclosure and may not constitute prior art.

Getting tired of squeezing through the sliding glass door with the limited space between the sliding door and the pet door. Carrying an item in your hands while passing through the limited space available with a sliding door inserted pet door was almost impossible. Accordingly, there is a need for a door to allow greater space for ingress and egress for humans while allowing a pet door to remain available. There is also a need to allow more space to swing a door open and place a pet door apparatus in the swinging door instead of the sliding door, however inserted pet doors are not readily available in wood frames for homes with wooden sliding doors.

Pets are an important part of most people's lives. Having a pet door is a wanted conversion in many homes with pets. When allowing a pet to ingress and egress with a pet door in a sliding glass door, the human is hindered in the space to ingress and egress. A Recap Swingin Human Pet Door, hereinafter pet door insert, solves this issue by creating greater space for human ingress and egress through a sliding door. Having two different heights needed for pet ingress and egress can also be an issue. The use of the screen door is interfered with for ventilation when using standard pet door inserts. Sliding doors are an obstacle for some people with heavy sliding glass doors for ingress and egress. Some or all these issues are addressed with the various embodiments of the pet door insert described herein.

SUMMARY

Disclosed embodiments include structures and methods for improving the assembly of vehicle doors.

An illustrative embodiment relates to an insert for a sliding door. The insert for a sliding door includes an insert door frame configured to be inserted into and coupled to a track of a sliding door. The insert for a sliding door also includes at least one hinge coupled to the insert door frame and a swinging door coupled to the hinge. The insert for a sliding door further includes a pet door section of the swinging door configured to have at least one pet door coupled to the pet door section allowing ingress and egress for a pet through the at least one pet door by a pet.

Another illustrative embodiment relates to an insert for a sliding door. The insert for a sliding door includes an insert door frame configured to be inserted into and coupled to a track of a sliding door. The insert for a sliding door also includes an adjustable header portion of the insert door frame configured to be adjustable to varying sliding door heights. Further, the insert for a sliding door includes at least one hinge coupled to the insert door frame and a swinging door coupled to the hinge. Further still, the insert for a sliding door comprises a pet door section of the swinging door configured to have at least one pet door coupled to the pet door section allowing ingress and egress for a pet through the at least one pet door by a pet.

Yet another illustrative embodiment relates to an insert for a sliding door. The insert includes an insert door frame means configured to be inserted into and coupled to a track of a sliding door, an adjustable header means of the insert door frame configured to be adjustable to varying sliding door heights, at least one hinge coupled to the insert door frame means, and a swinging door means coupled to the hinge. Further, the insert includes a pet door section means of the swinging door means configured to have at least one pet door coupled to the pet door section allowing ingress and egress for a pet through the at least one pet door by a pet.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1:
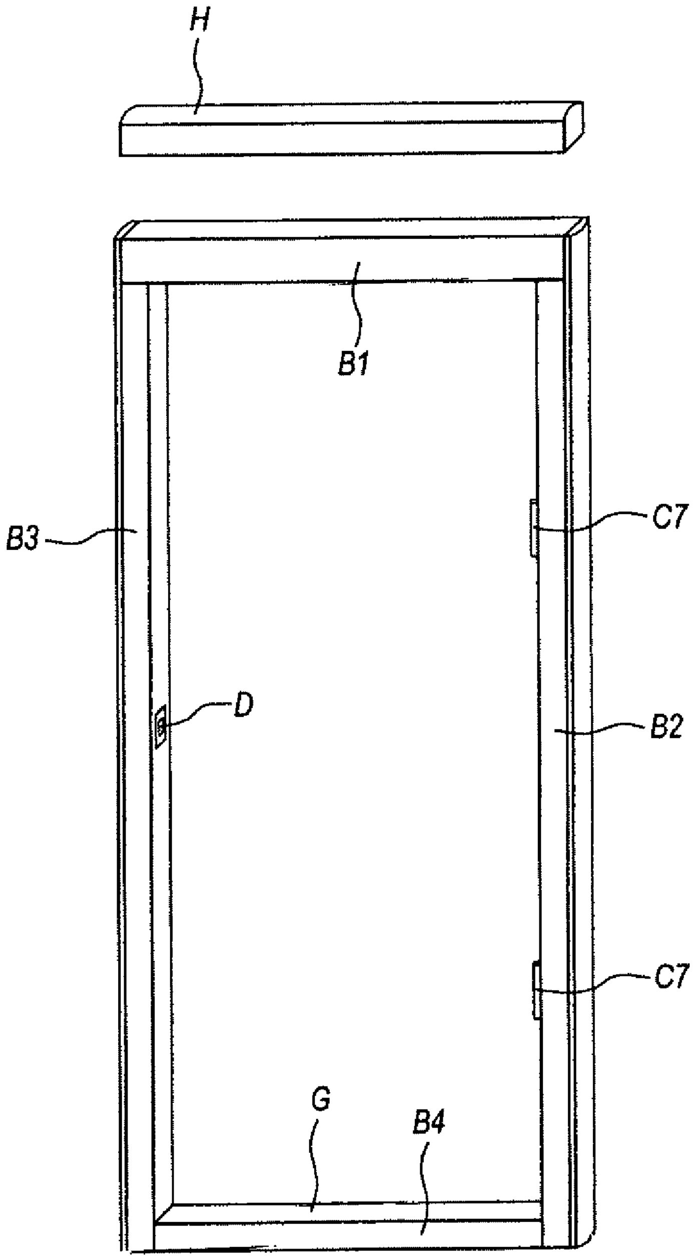
FIG. 1 is an illustrative embodiment of a pet door insert for a sliding door.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Illustrative embodiments are related to a pet door insert for the use with a sliding door that is removable. In various illustrative embodiments no alteration is needed of the existing sliding door or sliding door frame. A pet door insert replaces one of the panels of the sliding glass door with a door frame that fits into and is secured into the track of a sliding glass door. The frame supports a swinging door as well as one or more pet doors in the swinging door.

Figure 2:
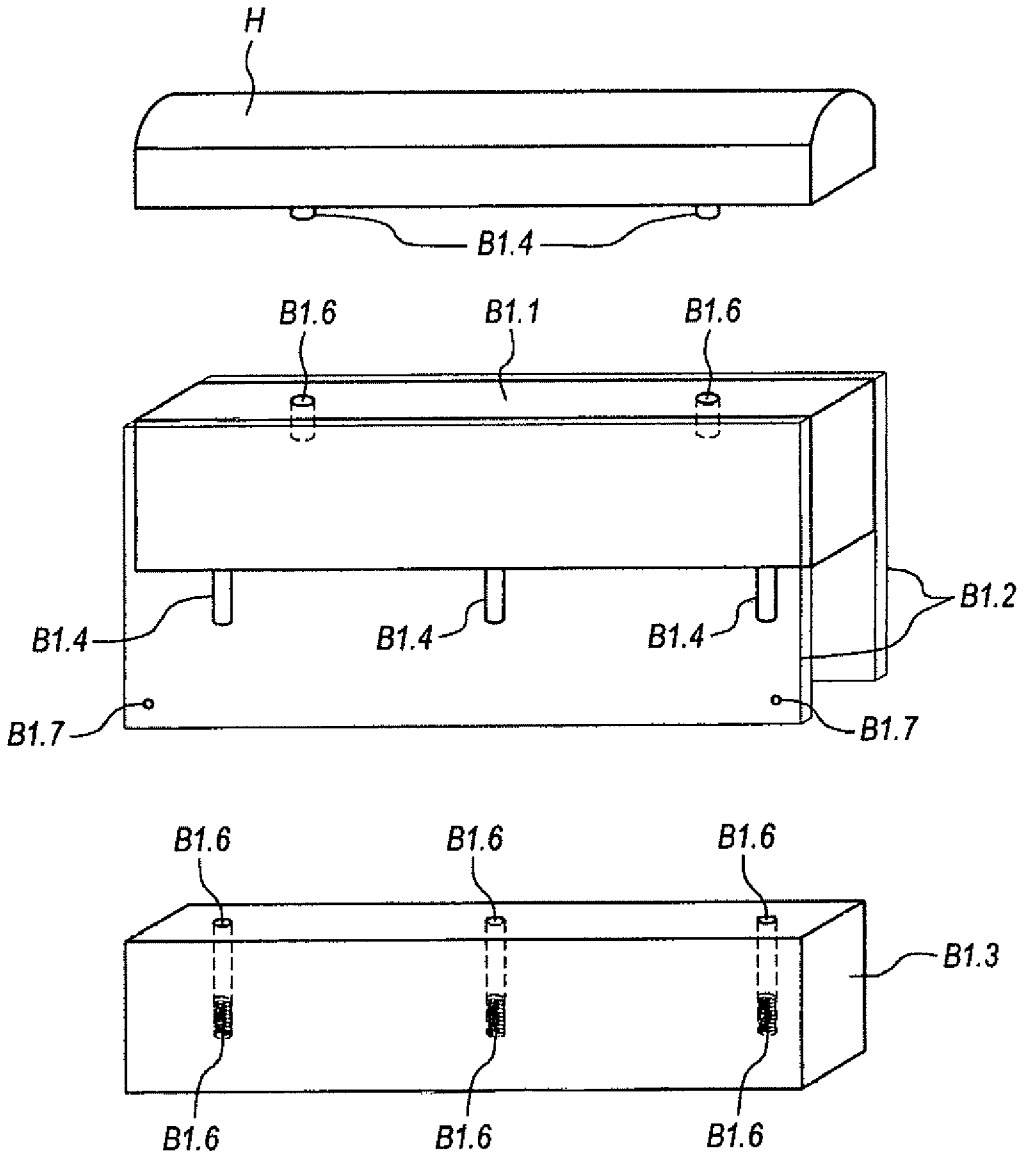
FIG. 2 is an illustrative breakdown view of the header portion of the pet door insert.

The pet door insert is placed in the opening of the open sliding door and locked in place by pressing (F) pressure bar against the sliding door frame to on the sliding glass door frame, as shown in FIG. 1. Referring now to FIG. 2, prior to using the pressure bar, the top of the pet door insert frame unit B1 is placed into the sliding door frame pushed up into the sliding door groove then dropped into the lower portion of the sliding door frame and seated in the sliding door tracks. After seating the pet door insert in the sliding door tracks a Phillips head screwdriver is used to lock in place (B1.2) expansion sides, using screws (B1.7) to secure no further movement in (B1). Once these steps are completed the pet door insert may be fully functional.

To secure the door to the sliding door and lock it shut, simply close the pet door insert and secure the doorknob cylinder into the catch. The pet door insert cannot be opened once the door lock is engaged. To open pet door insert simply use the doorknob and release the lock, pull doorknob (C6) on the pet door insert as depicted in FIGS. 4 and 5.

Figure 4:
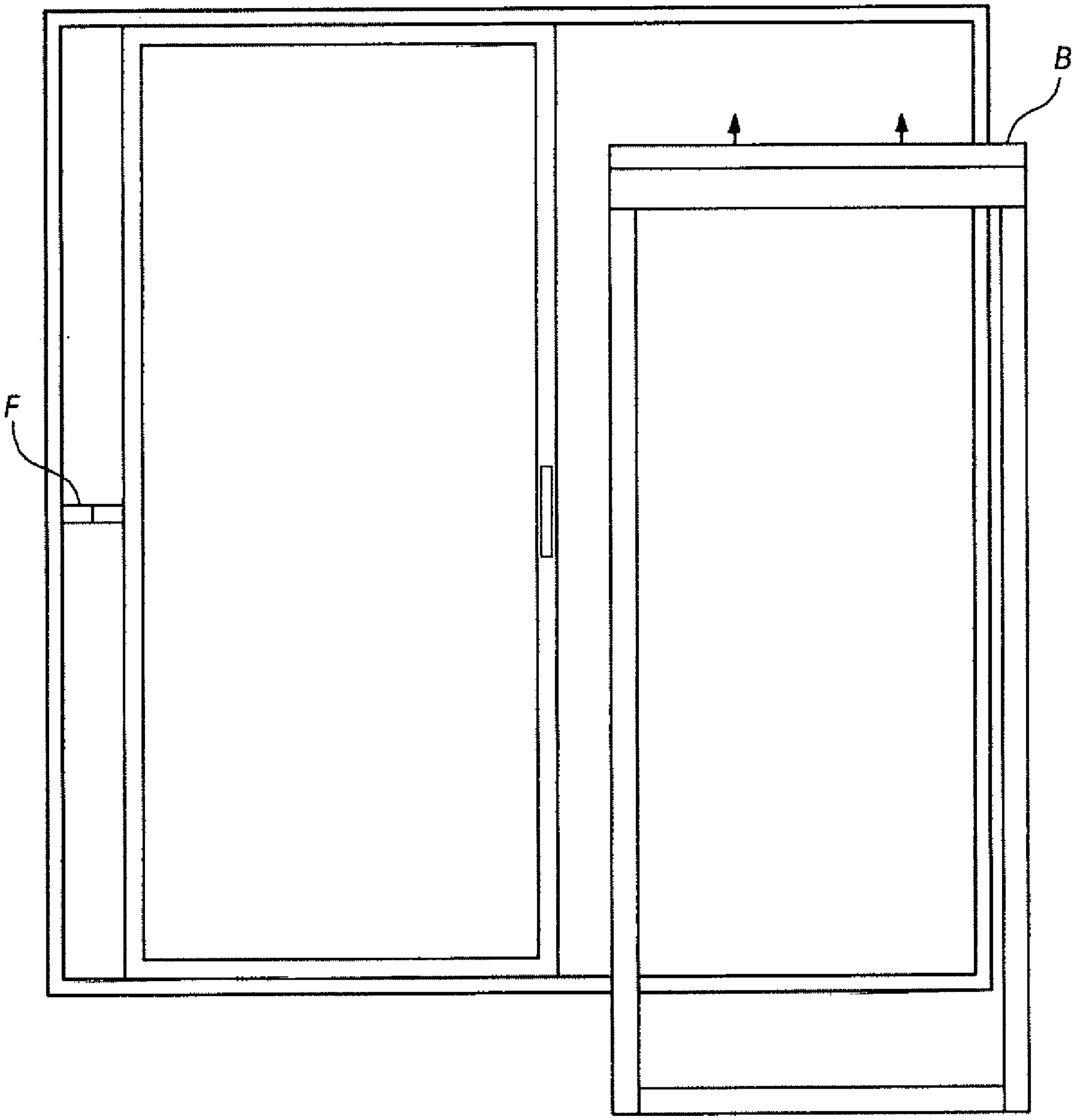
FIG. 4 is an illustrative embodiment of a pet door insert for a sliding door.
Figure 5:
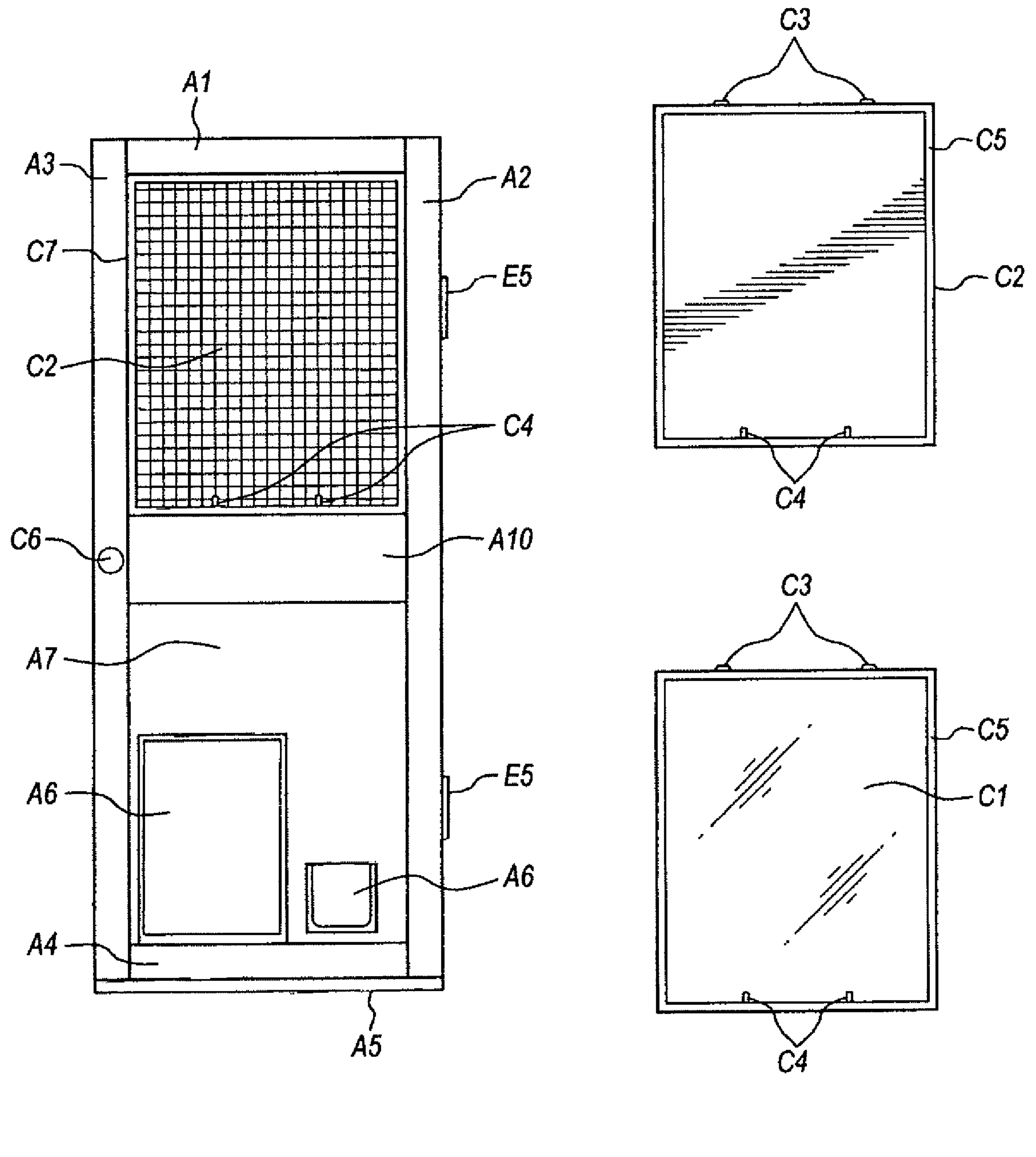
FIG. 5 is an illustrative embodiment of a pet door insert for a sliding door showing various window or screen inserts.
Figure 6:
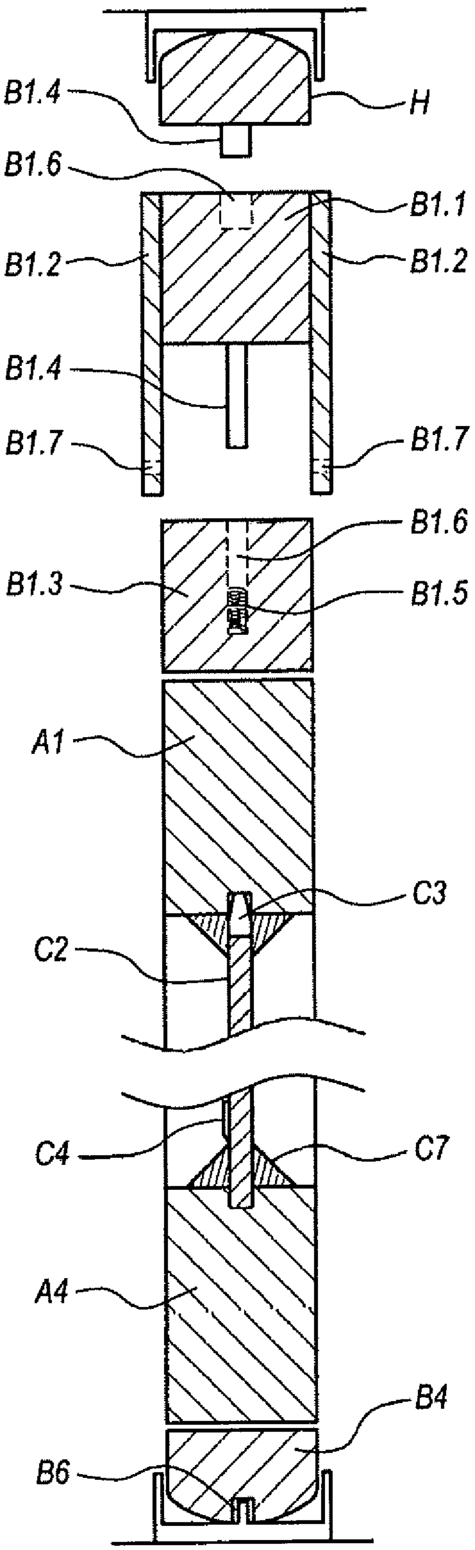
FIG. 6 is an illustrative embodiment of the adjustment portion for making top of frame adjustments.

Still referring to FIGS. 4 and 5, to use a screen in the pet door insert, simply turn the four twist hinges (E6) found on upper (A1) and lower (A10) outer portion of window trim and disengage them to release window (C1). Once this is completed simply pull window out by using the two tabs (C4) at bottom of window unit. Screen (C2) is fully functional at this point. To replace window reverse process by placing window frame (C1) back into the pet door insert opening covering screen and turn the four twist hinges (E5) on upper (A1) and lower (A11) outer portion of window trim to reengage lock window in place.

Pet door(s) (A6) can be locked or unlocked to allow pet(s) access to ingress and egress. The increase in size of the pet door frame allows for the use of two doors, one for large pets and one for small pets, at different heights, if needed for additional pet comfort. Cats typically don not want to use dog doors and dogs are typically too large to use the cat door. Therefore, it is beneficial in those instances to have the optionality for two different doors. Also, often times the dog needs to be locked in at times but the cats are allowed to freely roam.

Figure 3:
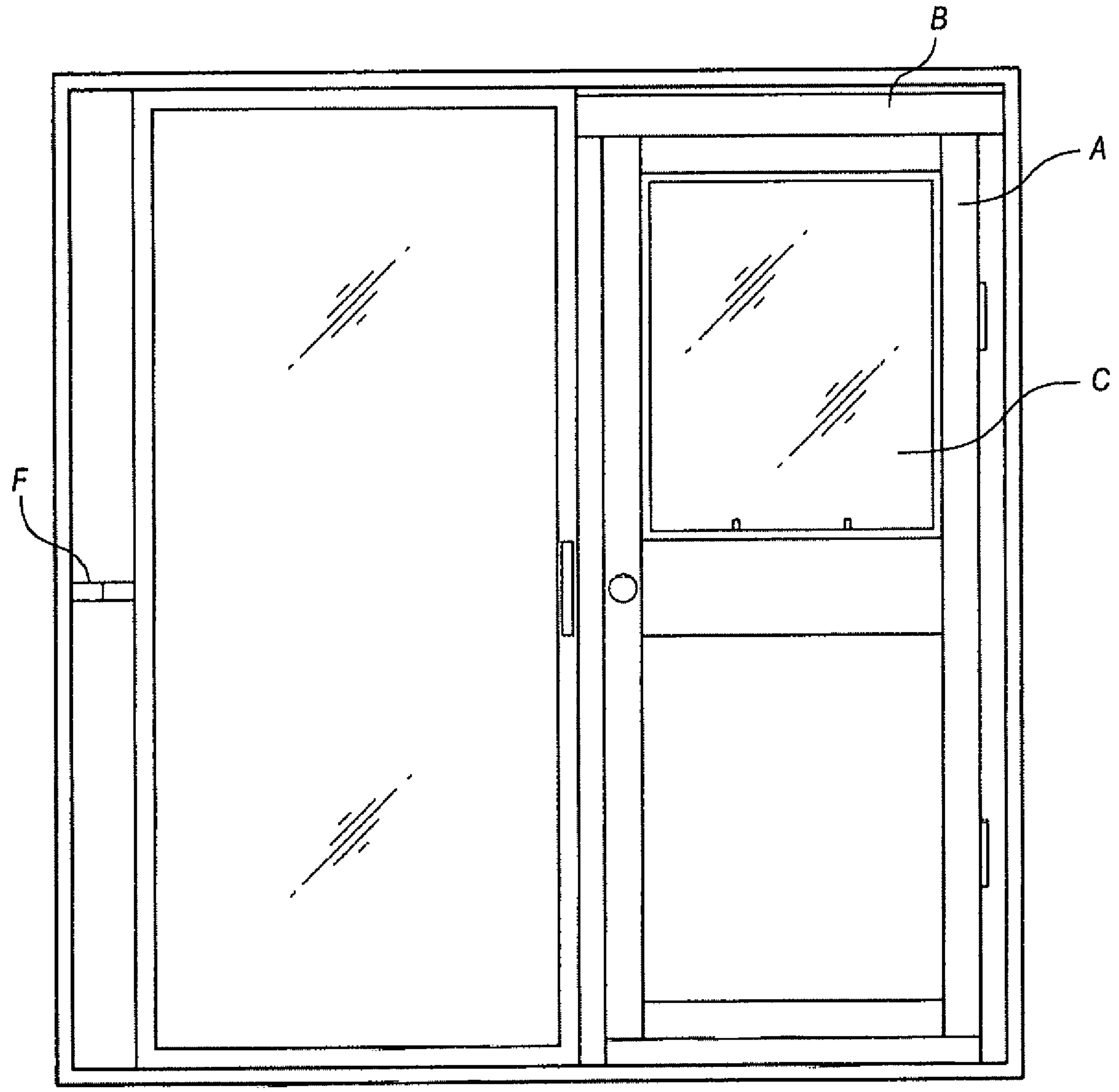
FIG. 3 is an illustrative embodiment of a sliding door insert for a pet door.

One of the obstacles to overcome is how to mount the invention in position securely. This may be accomplished by simply using a pressure bar and a full frame inserted into the sliding door frame. The sliding door is pressed against the pet door insert frame with a pressure bar (F). By putting pressure to the sliding door and the sliding door frame, the pet door insert may be locked in place, as shown in FIGS. 2 and 3. Once the pet door insert is firmly pressed to the sliding door using pressure bar (F) and frame of the sliding door, the pet door insert is secure. The rounded edges of the pet door insert frame sit into the sliding door frame snuggly. The pet door insert swinging door is ready for use.

In accordance with an illustrative embodiment as depicted in FIG. 5, a removable insert for the window (C1) and the installation of a screen (C2), is depicted, as is common with a storm door. The pet door insert may come with a removable glass insert (C1). Once the insert (C1) is removed by twisting the (E6) window holding brackets, the window can be removed by pulling tabs (C4) forward. Once window is removed screen is ready and available for use.

Illustrative embodiments cure the problem of human ingress and egress for a tight space, the need for not having space for two pet doors, and the air circulation when needed using a pet door. Also, the need or want for a swinging door as opposed to a sliding door without altering any structure, is also solved. Some sliding doors are heavy and hard to slide open for ingress and egress. By inserting the pet door insert in the sliding glass door frame eliminates the heavy sliding door and the door is then easier to open and close. The task of sliding a heavy glass sliding door is therefore eliminated.

Insulation of the door to prevent drafts is also needed. Simple door insulation trim as with door foam insulation solves the top, sides and bottom (A5). Insulation around window frame (C1) may also be provided. Next, placing a red "caution step" on the bottom frame (B) of the pet door insert is necessary because the pet door insert causes a small increase in the level of the bottom of the door opening.

Installation of the pet door insert may be completed by inserting pet door insert frame into the sliding door frame as shown in illustration 2 of FIG. 3. This is done by completely opening the sliding door (the door guide lock bar maybe removed) it is located in the upper portion of the sliding door to prevent the sliding portion of the door from sliding past the frame opening. Once the sliding door is completely opened, place the pet door insert frame into the sliding door opening. (Remove the hinge pins from the pet door insert to use just the pet door insert frame.) The pet door insert frame is then pushed upwards into the sliding door frame slot, same as the sliding door uses. In an illustrative embodiment, the top of the pet door insert frame will adjust. Next, the pet door insert frame is pushed up as high as needed to drop the lower portion of the pet door insert sliding door frame into the sliding door frames bottom. Once the pet door insert frame is in place, the sliding door is closed and the Pressure Lock may be used to secure door. Finally, the pet door insert swinging door may be reattached to the pet door insert frame and it is then ready for use.

In accordance with an exemplary embodiment, the side frame of pet door insert may be secured to a sliding door frame by allowing a spring pressured height adjustment of the pet door insert frame, as depicted in FIG. 2. The unit (B1) atop of the pet door insert door frame allows movement of height adjustment and vertical pressure between the pet door insert frame and sliding door frame. Once a position is obtained, side expansion pieces (B1.2) are mounted in place by screwing in (1.7) using a Phillips head screwdriver.

In accordance with some illustrative embodiments, insulation may be used to hold the door frame, in place snuggly along with sealing out draft. For example, a piece of standard insulation is used between all outside edges of the pet door insert frame and the inside of the pet door insert frame to stop draft from entering.

The pet door insert does not alter the sliding door or require changes to the sliding door to use it. The installation of the pet door insert requires only one tool, some measurements prior to installation and some common sense.

In accordance with illustrative embodiments, doors can be constructed from wood, metal, vinyl, etc. Top of frame B1 can be adjusted to meet the height of the individual sliding door.

The pet door insert may be made right or left opening by installing hinges E5, reversing door to opposite as shown in Interior view breakdown as shown in FIG. 4 which shows a right interior opening door.

Many advantages are achieved by use of the pet door insert including but not limited to the following:

1. Ease of human access while using a pet door.
2. Multiple pet doors if needed.
3. Airflow
4. Securely locking sliding door without removal of the pet door insert.
5. Swinging door for use with sliding door is needed or wanted without any structural alterations.

Convenience and comfort while having minimum changes of the original sliding door structure is provided by illustrative embodiments. The pet door insert answered the need for access for humans while having ingress and egress for their pets.

In some instances, one or more components may be referred to herein as "conFigured to," "conFigured by," "conFigurable to," "operable/operative to," "adapted/adaptable," "able to," "conformable/conformed to," etc. Those skilled in the art will recognize that such terms (e.g. "conFigured to") generally encompass active-state components and/or inactive-state components and/or standby-state components, unless context entails otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. An insert for a sliding door, comprising:

an insert door frame configured to be inserted into and coupled to a track of a sliding door; the insert door frame including a header portion adjustable to varying sliding door heights; at least one hinge coupled to the insert door frame; a swinging door received within the insert door frame and coupled to the at least one hinge; the insert door frame surrounding the swinging door on four sides of the swinging door; the swinging door swingable between an open position and a closed position; a door lock for locking the swinging door in the closed position relative to the insert door frame; a doorknob for releasing the door lock, and allowing the swinging door to be moved to the open position; a removable window insert received within the swinging door; and a pet door section received within the swinging door; the pet door section including at least one pet door for allowing ingress and egress for a pet through the at least one pet door while the swinging door is in the closed position.

2. The insert for a sliding door of claim 1, wherein the insert includes a pressure bar for holding the insert door frame from sliding relative to a second panel of the sliding door.

3. The insert for a sliding door of claim 1, wherein the at least one hinge comprises two swinging door hinges.

4. The insert for a sliding door of claim 1, wherein the swinging door comprises a wood door.

5. The insert for a sliding door of claim 1, wherein the swinging door comprises a vinyl door.

6. The insert for a sliding door of claim 1, wherein the pet door section is configured with a cat door.

7. The insert for a sliding door of claim 1, wherein the pet door section is configured with a dog door.

8. The insert for a sliding door of claim 1, wherein the pet door section is configured with a dog door and a cat door.

9. The insert for a sliding door of claim 1, wherein the pet door section is configured with a dog door and a cat door and the dog door is located at a height above the cat door.

10. The insert for a sliding door of claim 1, wherein the pet door section is configured with a dog door and a cat door and the dog door is bigger than the cat door.

* * * * *